US008213989B2

(12) United States Patent
Jheng et al.

(10) Patent No.: US 8,213,989 B2
(45) Date of Patent: Jul. 3, 2012

(54) METHODS FOR TRANSMITTING MOBILE ORIGINATED REQUESTS BY MOBILE STATION WITH SUBSCRIBER IDENTITY CARDS AND SYSTEMS UTILIZING THE SAME

(75) Inventors: Yu-Syuan Jheng, Luodong Township, Yilan County (TW); Keng-Chung Lin, Kaohsiung (TW); Chun-Ying Wu, Gongliao Shiang (TW)

(73) Assignee: Mediatek Inc., Hsinchu (TW)

( * ) Notice: Subject to any disclaimer, the term of this patent is extended or adjusted under 35 U.S.C. 154(b) by 486 days.

(21) Appl. No.: 12/337,729

(22) Filed: Dec. 18, 2008

(65) Prior Publication Data

US 2009/0239584 A1 Sep. 24, 2009

Related U.S. Application Data

(60) Provisional application No. 61/038,426, filed on Mar. 21, 2008.

(51) Int. Cl.
*H04M 1/00* (2006.01)
*H04W 40/00* (2009.01)
*H04W 4/00* (2009.01)
(52) U.S. Cl. ............... 455/558; 455/445; 455/432.1
(58) Field of Classification Search .......... 455/405, 455/406, 432.1, 444, 455, 558, 417, 432.2, 455/433
See application file for complete search history.

(56) References Cited

U.S. PATENT DOCUMENTS

| | | | | |
|---|---|---|---|---|
| 6,185,436 B1* | 2/2001 | Vu | ............................ | 455/558 |
| 6,516,190 B1* | 2/2003 | Linkola | .................... | 455/408 |
| 6,543,686 B1* | 4/2003 | Ritter | ........................ | 235/380 |
| 7,171,226 B2 | 1/2007 | Crocker et al. | | |
| 7,174,174 B2 | 2/2007 | Boris et al. | | |
| 2002/0099846 A1 | 7/2002 | Hicks | | |
| 2003/0125073 A1 | 7/2003 | Tsai et al. | | |
| 2004/0006512 A1 | 1/2004 | Rebsamen | | |
| 2004/0023687 A1 | 2/2004 | Diomelli | | |

(Continued)

FOREIGN PATENT DOCUMENTS

CN 1383340 12/2002

(Continued)

OTHER PUBLICATIONS

English language translation of abstract of CN 1383340 (published Dec. 4, 2002).

(Continued)

*Primary Examiner* — Danh Le
*Assistant Examiner* — Nelson Rosario
(74) *Attorney, Agent, or Firm* — Thomas|Kayden

(57) ABSTRACT

A method for transmitting mobile originated requests by a mobile station with a first subscriber identity card and a second subscriber identity card, executed by a processor, is provided. It is determined whether a preference setting has been enabled. A preferred subscriber identity card is obtained from the first subscriber identity card and the second subscriber identity card when the preference setting has been enabled. The mobile originated request is issued to a called party via the preferred subscriber identity card when the preference setting has been enabled.

27 Claims, 15 Drawing Sheets

U.S. PATENT DOCUMENTS

| | | |
|---|---|---|
| 2005/0170854 A1 | 8/2005 | Benco et al. |
| 2006/0258353 A1 | 11/2006 | Makela et al. |
| 2007/0131780 A1 | 6/2007 | Ho |
| 2007/0184858 A1 | 8/2007 | Landschaft et al. |
| 2008/0020773 A1* | 1/2008 | Black et al. .................. 455/445 |
| 2008/0070631 A1 | 3/2008 | Kumar |
| 2009/0005085 A1 | 1/2009 | Das |

FOREIGN PATENT DOCUMENTS

| | | |
|---|---|---|
| CN | 1777306 | 5/2006 |
| CN | 1812610 | 8/2006 |
| CN | 101056434 | 10/2007 |
| CN | 101094476 | 12/2007 |
| CN | 101094500 | 12/2007 |
| CN | 101098547 | 1/2008 |
| EP | 1718087 | 11/2006 |

OTHER PUBLICATIONS

English language translation of abstract of CN 101056434 (published Oct. 17, 2007).

English language translation of abstract of CN 101094476 (published Dec. 26, 2007).

English language translation of abstract of CN 1812610 (published Aug. 2, 2006).

English language translation of abstract of CN 101094500 (published Dec. 26, 2007).

English language translation of abstract of CN 101098547 (published Jan. 2, 2008).

English language translation of abstract of CN 1777306 (published May 24, 2006).

* cited by examiner

| Subscriber Identity Card | Called Operator | Dialed Prefix | Time | Charge Per Sec |
|---|---|---|---|---|
| 1st Card | CHT | 0919 | 09:00~12:00 | 0.002 |
| 1st Card | CHT | 0919 | 23:00~01:00 | 0.0015 |
| 2nd Card | CHT | 0919 | 10:00~15:00 | 0.003 |

FIG. 10

METHODS FOR TRANSMITTING MOBILE ORIGINATED REQUESTS BY MOBILE STATION WITH SUBSCRIBER IDENTITY CARDS AND SYSTEMS UTILIZING THE SAME

CROSS REFERENCE TO RELATED APPLICATIONS

This application claims the benefit of U.S. Provisional Application No. 61/038,426, filed on Mar. 21, 2008, the entirety of which is incorporated by reference herein.

BACKGROUND OF THE INVENTION

1. Field of the Invention

The invention relates to a method for transmitting a mobile originated request by a mobile station, and more particularly to a method for transmitting a mobile originated request by a mobile station with multiple subscriber identity cards.

2. Description of the Related Art

Currently, the Global System for Mobile communication (GSM) standard is the popular standard for mobile phones in the world. The GSM standard, standardized by the European Telecommunication Standards Institute (ETSI) is a cellular network structure and a Time Division Multiple Access (TDMA) system. For a carrier frequency, the TDMA system will divide a frame into eight time slots, wherein each time slot is used to transmit a channel data for a subscriber. In addition, the General Packet Radio Service (GPRS) technology is one of the available technologies of a GSM system. The GPRS technology utilizes the unused channels in the GSM system to provide moderate speed data transmission. The Wideband Code Division Multiple Access (W-CDMA) is a wideband spread-spectrum mobile air interface that utilizes the direct-sequence spread spectrum method of asynchronous code division multiple access to achieve higher speeds and support more users compared to the implementation of time division multiplexing (TDMA) used by GSM systems. Time Division-Synchronous Code Division Multiple Access (TD-SCDMA) is another type of 3G mobile telecommunications standard.

A dual SIM mobile phone is a phone with two Subscriber Identity Modules (SIMs), which correspond to different telephone numbers. The dual SIM mobile phone allows a user to use two communication services without carrying two phones at the same time. For example, the same mobile phone may be used for business and private use with separate numbers and bills, thus providing convenience to mobile phone users.

BRIEF SUMMARY OF THE INVENTION

Methods for transmitting a mobile originated (MO) request by a mobile station with a first subscriber identity card and a second subscriber identity card and the systems utilizing the same are provided. An exemplary embodiment of a method for transmitting a mobile originated request by a mobile station with a first subscriber identity card and a second subscriber identity card, executed by a processor, is provided. It is determined whether a preference setting has been enabled. A preferred subscriber identity card is obtained from the first and second subscriber identity cards when the preference setting has been enabled. The mobile originated request is issued to a called party via the preferred subscriber identity card when the preference setting has been enabled.

Furthermore, another exemplary embodiment of a method for transmitting a mobile originated request by a mobile station with a first subscriber identity card and a second subscriber identity card, executed by a processor, is provided. A first roaming information indicating whether the first subscriber identity card is in a roaming or non-roaming status and a second roaming information indicating whether the second subscriber identity card is in a roaming or non-roaming status are obtained. One subscriber identity card is determined from the first subscriber identity card and the second subscriber identity card according to the first roaming information and the second roaming information. The mobile originated request is issued to a called party via a cell that the determined subscriber identity card camps on.

Moreover, another exemplary embodiment of a method for transmitting a mobile originated request by a mobile station with a first subscriber identity card and a second subscriber identity card, executed by a processor, is provided. A first cell identity report is obtained from a first cell that the first subscriber identity card camps on, wherein the first cell identity report comprises a plurality of cell identities (IDs) of the neighboring cells of the first cell. A plurality of low-fee cell IDs is obtained from a storage device of the mobile station. One subscriber identity card is determined from the first subscriber identity card and the second subscriber identity card according to the first cell identity report and the low-fee cell IDs. The mobile originated request is issued to a called party via a cell that the determined subscriber identity card camps on.

Furthermore, another exemplary embodiment of a method for transmitting a mobile originated request by a mobile station with a first subscriber identity card and a second subscriber identity card, executed by a processor, is provided. A dialed number of a called party and a current time are obtained. A called operator is identified according to the dialed number. One subscriber identity card is determined from the first subscriber identity card and the second subscriber identity card according to the current time and a fare plan for the identified called operator. The mobile originated request is issued to the called party via the determined subscriber identity card.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 5 shows an embodiment of a method for updating roaming information by a mobile station when listening to a cell that a subscriber identity card camps on;

FIG. 10 shows a table illustrating an exemplary fare plan that may be stored in a memory of a mobile station;

DETAILED DESCRIPTION OF THE INVENTION

Figure 1:
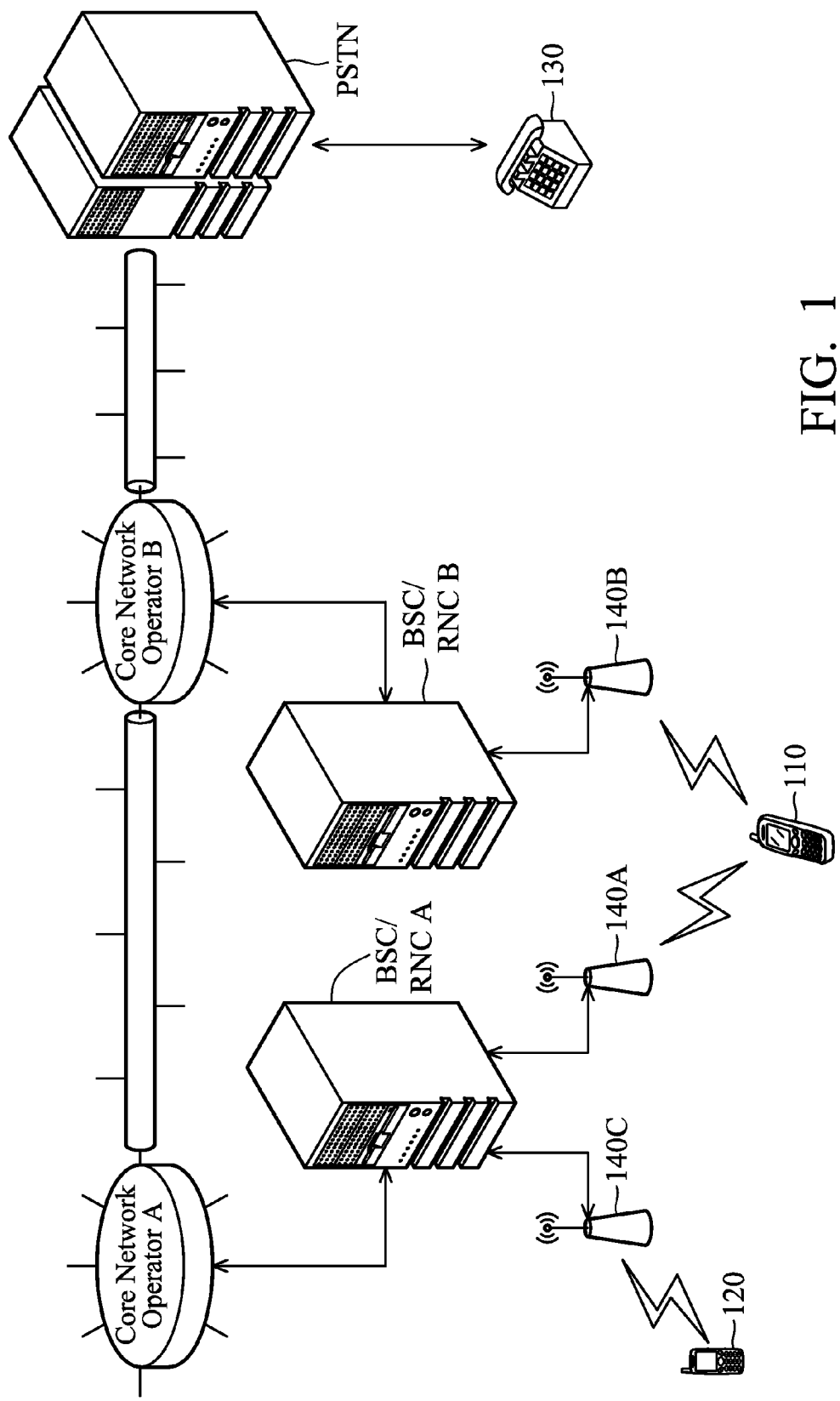
FIG. 1 shows a schematic diagram of a mobile communication network system.

The following description is of the best-contemplated mode of carrying out the invention. This description is made for the purpose of illustrating the general principles of the invention and should not be taken in a limiting sense. The scope of the invention is best determined by reference to the appended claims.

A subscriber identity module (SIM) card typically contains user account information, an international mobile subscriber identity (IMSI) and a set of SIM application toolkit (SAT) commands and provides storage space for phone book contacts. A micro-processing unit (MCU) of the Baseband chip (simply referred to as a Baseband MCU hereinafter) may interact with MCUs of the SIM cards (each simply referred to as a SIM MCU hereinafter) to fetch data or SAT commands from the plugged in SIM cards. A mobile station (MS) is immediately programmed after plugging in the SIM card. SIM cards may also be programmed to display custom menus for personalized services.

A universal SIM (USIM) card is inserted into a mobile station for universal mobile telecommunications system (UMTS) or Time Division-Synchronous Code Division Multiple Access (TD-SCDMA) system (also called 3G) telephony communication. The USIM card stores user account information, an IMSI, authentication information and a set of USIM Application Toolkit (USAT) commands and provides storage space for text messages and phone book contacts. A Baseband MCU may interact with an MCU of the USIM card (each simply referred to as a USIM MCU hereinafter) to fetch data or SAT commands from the plugged in USIM cards. The phone book on the USIM card is greatly enhanced when compared to the SIM card. For authentication purposes, the USIM card may store a long-term preshared secret key K, which is shared with the Authentication Center (AuC) in the network. The USIM MCU may verify a sequence number that must be within a range using a window mechanism to avoid replay attacks, and is in charge of generating the session keys CK and IK to be used in the confidentiality and integrity algorithms of the KASUMI (also termed A5/3) block cipher in the UMTS. A mobile station is immediately programmed after plugging in the USIM card.

A removable User Identity Module (R-UIM) or a Code Division Multiple Access (CDMA) Subscriber Identity Module (CSIM) card has already been developed for a CDMA mobile station and is equivalent to the GSM SIM and 3G USIM except that it is capable of working in CDMA networks. The R-UIM or the CSIM card is physically compatible with the GSM SIM card, and provides similar security mechanisms for the CDMA system.

The International Mobile Subscriber Identity (IMSI) is a unique number associated with a global system for mobile communication (GSM) or a universal mobile telecommunications system (UMTS) network user. The IMSI may be sent by a mobile station to a GSM or UMTS network to acquire other details of the mobile user in the Home Location Register (HLR) or as locally copied in the Visitor Location Register (VLR). An IMSI is typically 15 digits long, but may be shorter (for example MTN South Africa's IMSIs are 14 digits). The first 3 digits are the Mobile Country Code (MCC), and they are followed by the Mobile Network Code (MNC), which is either 2 digits (European standard) or 3 digits (North American standard). The remaining digits are the mobile subscriber identification number (MSIN) for a GSM or UMTS network user.

FIG. 1 shows a schematic diagram of a mobile communication network system. In FIG. 1, a mobile station (may be called user equipment interchangeably) 110 with dual subscriber identity cards A and B may simultaneously access two core networks such as a Global System for Mobile Communications (GSM), Wideband Code Division Multiple Access (WCDMA), CDMA 2000 and Time Division-Synchronous Code Division Multiple Access (TD-SCDMA) network and the like after camping on two cells 140A and 140B (i.e. each may be a base station, a node-B or others). The subscriber identity card A or B may be a SIM, USIM, R-UIM or CSIM card. The mobile station 110 may make a voice or data call to a called party 120 or 130 through the GSM system with the Base Station Controller (BSC), WCDMA/CDMA2000/TD-SCDMA network with Radio Network Controller (RNC), Public Switched Telephone Network (PSTN) or any combinations thereof using either of the subscriber identity cards A or B. For example, the mobile station 110 may make a voice call with the subscriber identity card A to the called party 120 through the cell 140A, an BSC/RNC A and a cell 140C in sequence, or make a voice call with the subscriber identity card B to the called party 120 through the cell 140B, an BSC/RNC B, a core network operator B, a core network operator A, the BSC/RNC A and the cell 140C in sequence. Moreover, the mobile station 110 may receive a phone call request with either of the subscriber identity cards A or B from the calling party 120 or 130. For example, the mobile station 110 may receive a phone call request to the subscriber identity card B from the calling party 130 via a Public Switched Telephone Network (PSTN), the core network operator B, the BSC/RNC B and the cell 140B.

Figure 2A:
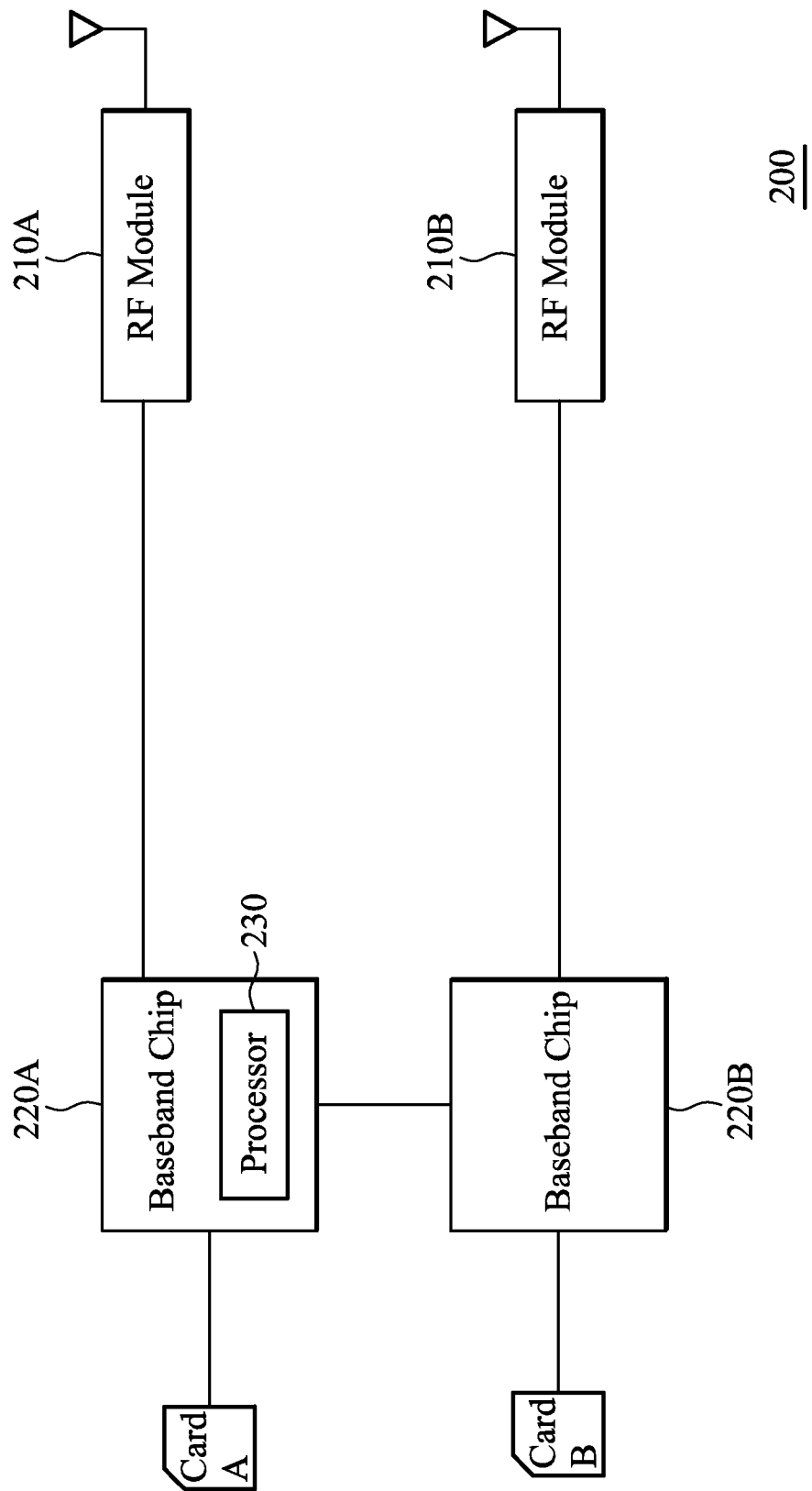
FIG. 2A shows a mobile station according to an embodiment of the invention.

FIG. 2A shows the hardware architecture of a mobile station 200 according to an embodiment of the invention. The mobile station 200 comprises two radio frequency (RF) modules 210A and 210 B and two Baseband chips 220A and 220B, wherein the RF module 210A is coupled to the Baseband chip 220A and the RF module 210B is coupled to the Baseband chip 220B. Two subscriber identity cards A and B may be plugged into two sockets of the mobile station 200 connecting to the Baseband chips 220A and 220B, respectively. Each of the subscriber identity cards A and B may be a SIM, USIM, R-UIM or CSIM card, which is provided by a particular network operator. The mobile station 200 can therefore simultaneously camp on two cells (base stations or node-Bs) provided by either the same network operator or different network operators for the plugged in cards A and B and operate in stand-by/idle modes, or even dedicated modes, using different RF modules and Baseband chips. Each of the Baseband chips 220A and 220B may read data from a particular subscriber identity card A or B and write data to the subscriber identity card A or B. Furthermore, the Baseband chip 220A may be a master device for the mobile station 200, and the Baseband chip 220A comprises a processor 230 for controlling the communications between the subscriber identity cards A and B and the RF modules 210A and 210 B. A further processor (not shown) may be provided in the Baseband chip 220B to coordinately operate with the processor 230 of the Baseband 220A to improve performance.

Figure 2B:
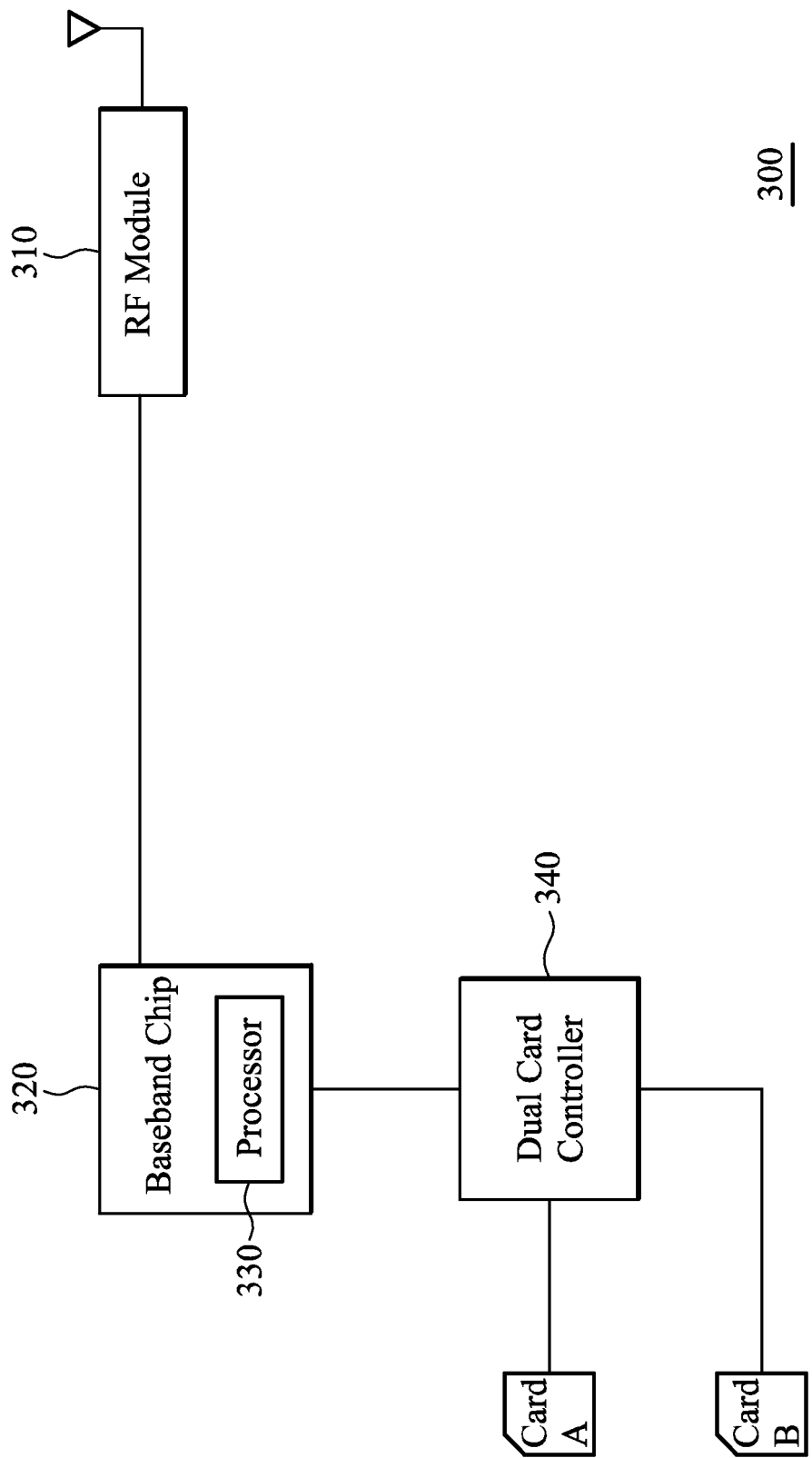
FIG. 2B shows a mobile station according to another embodiment of the invention.

FIG. 2B shows the hardware architecture of a mobile station 300 according to another embodiment of the invention. The mobile station 300 comprises an RF module 310, a Baseband chip 320 and a dual card controller 340, wherein the two subscriber identity cards A and B may be plugged into two sockets of the mobile station 300 connecting to the dual card controller 340. Those skilled in the art may practice the dual card controller 340 in the Baseband chip 320. Each of the subscriber identity cards A and B may be a SIM, USIM, R-UIM or CSIM card, which is provided by a particular network operator. The mobile station 300 may therefore camp on two cells provided by either the same network operator or different network operators for the plugged in cards A and B and operate in stand-by/idle modes, or even dedicated modes, using the same RF module and Baseband chip. The dual card controller 340 is coupled/connected between the Baseband chip 320 and the subscriber identity cards A and B. Furthermore, the Baseband chip 320 comprises a processor 330 for controlling the communications between the subscriber identity cards A and B and the RF module 310. Moreover, the processor 330 of the Baseband chip 320 may read data from the subscriber identity card A or B via the dual card controller 340, and may also write data to the subscriber identity card A or B via the dual card controller 340.

An RF module (e.g. 210A or 210B of FIG. 2A, or 310 of FIG. 2B) receives wireless radio frequency signals, converts the received signals to baseband signals to be processed by a corresponding Baseband chip (e.g. 220A or 220B of FIG. 2A, or 320 of FIG. 2B), or receives baseband signals from the Baseband chip and converts the received signals to wireless radio frequency signals to be transmitted to a peer device. The RF module may comprise a plurality of hardware devices to perform radio frequency conversion. For example, the RF module may comprise a mixer to multiply the baseband signals with a carrier oscillated in the radio frequency of the wireless communication system, wherein the radio frequency may be, for example, 900 MHz or 1800 MHz or 2100 MHz for a global system for mobile communication (GSM), or 1900 MHz or 2100 MHz for a Universal Mobile Telecommunications System (UMTS) or a Time Division-Synchronous Code Division Multiple Access (TD-SCDMA) system. The Baseband chip further converts the baseband signals to a plurality of digital signals, and processes the digital signals, and vice versa. The Baseband chip may also comprise a plurality of hardware devices to perform baseband signal processing. The baseband signal processing may comprise analog to digital conversion (ADC), digital to analog conversion (DAC), gain adjustments, modulation/demodulation, encoding/decoding, and so on.

As the mobile station equipped with two or more subscriber identity cards as shown in FIG. 2A or FIG. 2B, the mobile station can be operated in an idle mode and dedicated mode for each inserted subscriber identity card. Referring to FIG. 1, in an idle mode, the mobile station 110 is either powered off, searches for or measures the Broadcast Control Channel (BCCH) with better signal quality from a base station (e.g. the cell 140A or 140B) provided by a specific network operator, or is synchronized to the BCCH of a specific base station to be ready to perform a random access procedure on the Random Access Channel (RACH) to request a dedicated channel. In a dedicated mode, the mobile station 110 occupies a physical channel and tries to synchronize therewith, and establishes logical channels and switches throughout them.

Specifically, for each inserted subscriber identity card in the idle mode, the mobile station 110 continuously listens to the BCCH from a base station and reads the BCCH information and conducts periodic measurements of the signaling strength of the BCCH carriers in order to select a suitable cell to be camped on. In the idle mode, no exchange of signaling messages is presented with the network. The data required for Radio Resource Management (RR) and other signaling procedures is collected and stored, such as the list of neighboring BCCH carriers, thresholds for RR algorithms, Common Control Channel (CCCH) configurations, information regarding the use of RACH and Paging channel (PCH), or others. Such kind of information (e.g. system information (SI)) is broadcasted by a base station system on the BCCH and provides information about the network configuration. Moreover, the SI is available for all mobile stations currently in the cell. The SI comprises a Public Land Mobile Network (PLMN) code uniquely owned by a network operator. The PLMN code comprising a Mobile Country Code (MCC) and a Mobile Network Code (MNC), indicating which network operator is providing the communication services. In addition, a cell identity (ID) indicating which cell is broadcasting the BCCH is also contained in the SI. Furthermore, the SI may comprise network identification, neighboring cells, channel availability and power control requirements etc. The PLMN code may be acquired and stored in a corresponding subscriber identity card of the electronic device upon receiving the SI from the BCCH. The Base Station System (BSS) further continuously sends out, on all PCHs of a cell valid Layer 3, messages (PAGING REQUEST) which the mobile station 110 can decode and recognize if its address (e.g. its IMSI of a specific SIM card) is paged. The mobile station 110 periodical monitors the PCHs to avoid loss of paging calls.

Each exchange of signaling messages with the network, e.g. BSS, Mobile Switching Center (MSC) and the similar, requires an Radio Resource Management (RR) connection and the establishment of an LAPDm connection between a mobile station and BSS. Setting up the RR connection can be initiated by the mobile station or network. In either situation, the mobile station sends a channel request (CHAN-QUEST) on the RACH in order to get a channel assigned on the Access Grant Channel (AGCH), also referred to as an immediate assignment procedure. The channel request may be rejected by an immediate assignment reject procedure. If the network does not immediately answer to the channel request, the request is repeated for a certain number of times. In the situation of a network-initiated connection, a procedure is preceded by a paging call (PAGING REQUEST) to be answered by the mobile station (PAGING RESPONSE). After an RR connection has been successfully completed, higher protocol layers, Connection Management (CM) and Mobility Management (MM) can receive and transmit signaling messages.

In contrast to the setup of connections, the release is typically initiated by the network (CHANNEL RELEASE). The release may occur when the signaling transaction ends, there are too many errors, or the channel is removed due to a higher priority call, e.g. an emergency call, or end of a call.

Once an RR connection has been set up, the mobile station has either a Stand-alone Dedicated Control Channel (SDCCH) or a Traffic Channel (TCH) with associated Slow/Fast Associated Control Channel (SACCH/FACCH) available for exclusive bidirectional use.

Setting up an MM connection from the mobile station presumes the existence of an RR connection, but a single RR connection can be used by multiple MM connections. If the MM connection can be established, the MS sends the message CM-SERVICE REQUEST to the network. The message CM-SERVICE REQUEST contains information regarding a mobile subscriber (IMSI or Temporary Mobile Subscriber Identity (TMSI)), where a TMSI has only local significance within a Location Area and must be used together with the Location Area Identity (LAI) for the unique identification of a subscriber, as well as information regarding the requested service (outgoing voice call, short message service SMS transfer, activation or registration of a supplementary service, or others). If the mobile station receives the message CM-SERVICE ACCEPT or local message from the RR sub-layer that enciphering has been activated, it is treated as an acceptance of the service request, and the requesting CM entity is informed about the successful setup of an MM connection. Otherwise, if the service request has been rejected by the network, the mobile station receives a message CM-SERVICE REJECT, and the MM connection cannot be established.

The mobile station equipped with two or more inserted subscriber identity card cards as shown in FIG. 2A or FIG. 2B, can be operated in an idle mode and connected mode for each inserted subscriber identity card, wherein the inserted subscriber identity cards are USIM cards. Referring to FIG. 1, in an idle mode, the mobile station selects (either automatically or manually) a PLMN to contact. The MS continuously listens to the BCCH to acquire an SI comprising a PLMN code uniquely owned by a network operator. The PLMN code comprising an MCC and an MNC, indicates which network operator is providing communication services. In addition, an ID indicating which cell is broadcasting the BCCH is also contained in the SI. The PLMN code may be acquired and stored in a corresponding USIM card of the electronic device upon receiving the SI from the BCCH. The mobile station searches for a suitable cell of the chosen PLMN, chooses that cell to provide available services, and tunes to its control channel, also referred to as "camping on a cell". After camping on a cell in an idle mode, the MS can receive system information and cell broadcast messages from a node-B (e.g. the cell 140A or 140B). The mobile station stays in an idle mode until the node-B transmits a request to establish a Radio Resource Control (RRC) connection. In the idle mode, the mobile station is identified by non-access stratum identities such as IMSI, TMSI and Packet-TMSI (P-TMSI).

In the Cell_DCH state of a connected mode, a dedicated physical channel is allocated to the mobile station, and the mobile station is known by its serving radio network controller (RNC) on a cell or active set level. The mobile station performs measurements and sends measurement reports according to measurement control information received from RNC. The mobile station with certain capabilities monitors the Forward Access Channel (FACH) for system information messages. In the Cell_FACH state of a connected mode, no dedicated physical channel is allocated for the mobile station, but a Random Access Channel (RACH) and FACH are used instead, for transmitting both signaling messages and small amounts of user plane data. In this state, the mobile station also listens to the Broadcast Channel (BCH) to acquire system information. The mobile station performs cell reselections, and after a reselection the mobile station typically sends a Cell Update message to the RNC, so that the RNC knows the MS location on a cell level. In the Cell_PCH state of a connected mode, the mobile station is known on a cell level in a Serving Radio Network Controller (SRNC), but the mobile station can be reached only via the Paging Channel (PCH). The URA_PCH state of a connected mode is very similar to the Cell_PCH state, except that the mobile station does not execute Cell Update after each cell reselection procedure, but instead reads the UMTS Terrestrial Radio Access Network (UTRAN) Registration Area (URA) identities from the BCH, and only if the URA changes (after cell reselection) does the mobile station inform its location to the SRNC. The mobile station leaves the connected mode and returns to the idle mode when the RRC connection is released or following RRC connection failure.

The establishment of an RRC connection and Signaling Radio Bearers (SRB) between a mobile station and UTRAN (RNC) is initiated by a request from higher layers (non-access stratum) on the mobile station side. In a network-originated case, the establishment is preceded by an RRC Paging message. The UTRAN (RNC) may respond with an RRC Connection Set-up message including a dedicated physical channel assignment for the mobile station (move to the Cell-FACH state), or a command to instruct the mobile station to use common channels (move to the Cell_FACH state).

Figure 3:
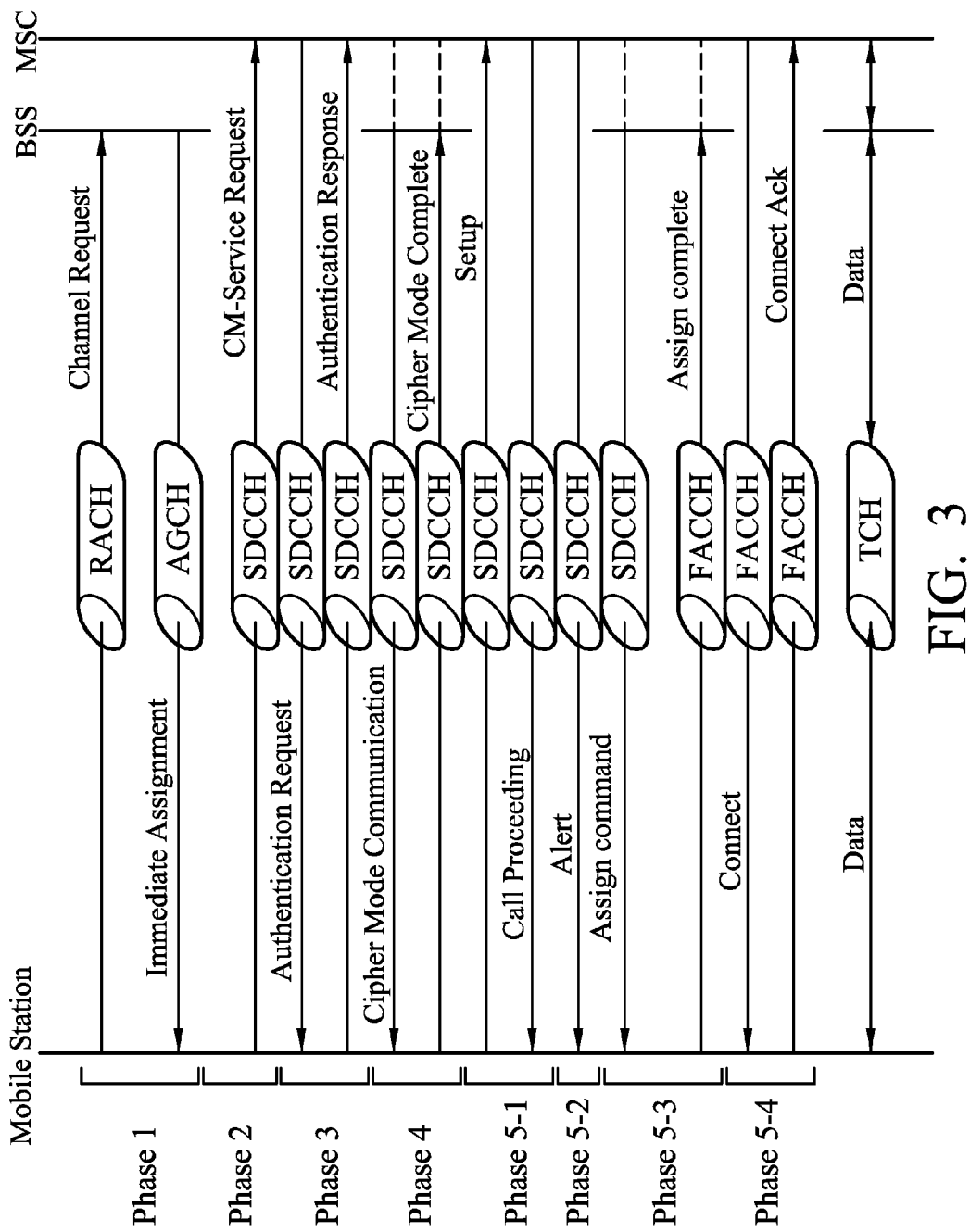
FIG. 3 shows logical channel assignments and signaling procedures of a mobile originated request in the GSM.

FIG. 3 shows exemplary logical channel assignments and signaling procedures of an apparatus originated communication request in the GSM system. In the GSM system, a Call Control (CC), comprises procedures to establish, control, and terminate a communication service, and is an element of Connection Management (CM). When a mobile station plans to originate a communication service, such as a voice call service, the CC entity first requests a Mobility Management (MM) connection from the local MM entity (Phase 1) via a Random Access Channel (RACH). For a standard call, the mobile station may need to register with the wireless network, whereas for an emergency call, registration is only optionally required. That is, an emergency call may be established on an un-enciphered Radio Resource (RR) connection from a mobile station that has not registered with the wireless network. The BSS in the wireless network may assign a Standalone Dedicated Control Channel (SDCCH) or a Traffic Channel (TCH) via an Immediate Assignment carried in the Access Grant Channel (AGCH). After the processes of sending out a CM-service request (Phase 2), authentication (Phase 3) and ciphering (Phase 4) with the MSC via the SDDCH is completed, an MM connection is established. After successful establishment of the MM connection and activation of the user data encryption, the service-requesting CC entity is informed. Thus, the signals on the connection desiring to connect to the CC entity in the Mobile Switching Center MSC (SETUP). The MSC may respond to the connection request in several ways. The MSC may indicate with a message Call Proceeding (Phase 5-1) that the call request has been accepted and that all the necessary information for the setup of the call is available. Otherwise, the call request may be declined with a message Release Complete. Next, the mobile station receives the Alert message (Phase 5-2) when the MSC is trying to connect to the called party. As soon as the called party receives the Alert message and accepts the call, the mobile station receives an Assign Command and a dedicated channel will be assigned after the mobile station responds to an Assignment Complete message via a Fast Associated Control Channel (FACCH) (Phase 5-3). The mobile station next responds with a Connect Acknowledge message after receiving the Connect message from the MSC (Phase 5-4), and the traffic channel, successfully established on the TCH and the mobile station, may now begin to communicate with the called party. It is to be noted that the CC procedure of the WCDMA or TD-SCDMA system is similar to that of GSM system and is not further described for brevity.

In addition, the CC in the GSM system has a number of special conditions, especially to account for the limited resources and properties of the radio channel. In particular, the call request of the mobile station can be entered into a queue (call queuing), if there is no immediately free TCH for the establishment of the call. The maximum waiting time, a call may have to wait for assignment of a TCH can be adjusted according to operator requirements. Furthermore, the point at which the TCH is actually assigned can be chosen. For example, the traffic channel can be assigned immediately after acknowledging the call request (CALL PROCEEDING), also referred to as early assignment. On the other hand, the call can be first processed completely and the assignment occurs only after the targeted subscriber is being called, also referred to as late assignment or Off-Air Call Setup (OACSU). The OACSU may avoid unnecessary allocation of a TCH if the called party is not available. On the other hand, there is the probability that after a successful call request signaling procedure, no TCH can be allocated for the calling party before the called party accepts the call, and thus the call cannot be completely switched through and is broken off.

Mobile-originated (MO) SMS messages are transported from a mobile station to a Short Message Service Centre (SMSC), and may be destined to mobile users, subscribers on a fixed network, or Value-Added Service Providers (VASPs), also known as application-terminated. Mobile-terminated (MT) SMS messages are transported from the SMSC to the destination mobile station.

In the GSM system, a completely established MM connection is required for the transport of SMS messages, which again presumes an existing RR connection with LAPDm protection on an SDCCH or SACCH. An SMS transport Protocol Data Unit (PDU) is transmitted with an RP-DATA message between an MSC and MS using the Short Message Relay Protocol (SM-RP). Correct reception is acknowledged with an RP-ACK message from the SMS service center (mobile-originated SMS transfer). In a WCDMA or TD-SCDMA system, before transport of SMS messages, an RRC connection has to be successfully established.

Figure 4:
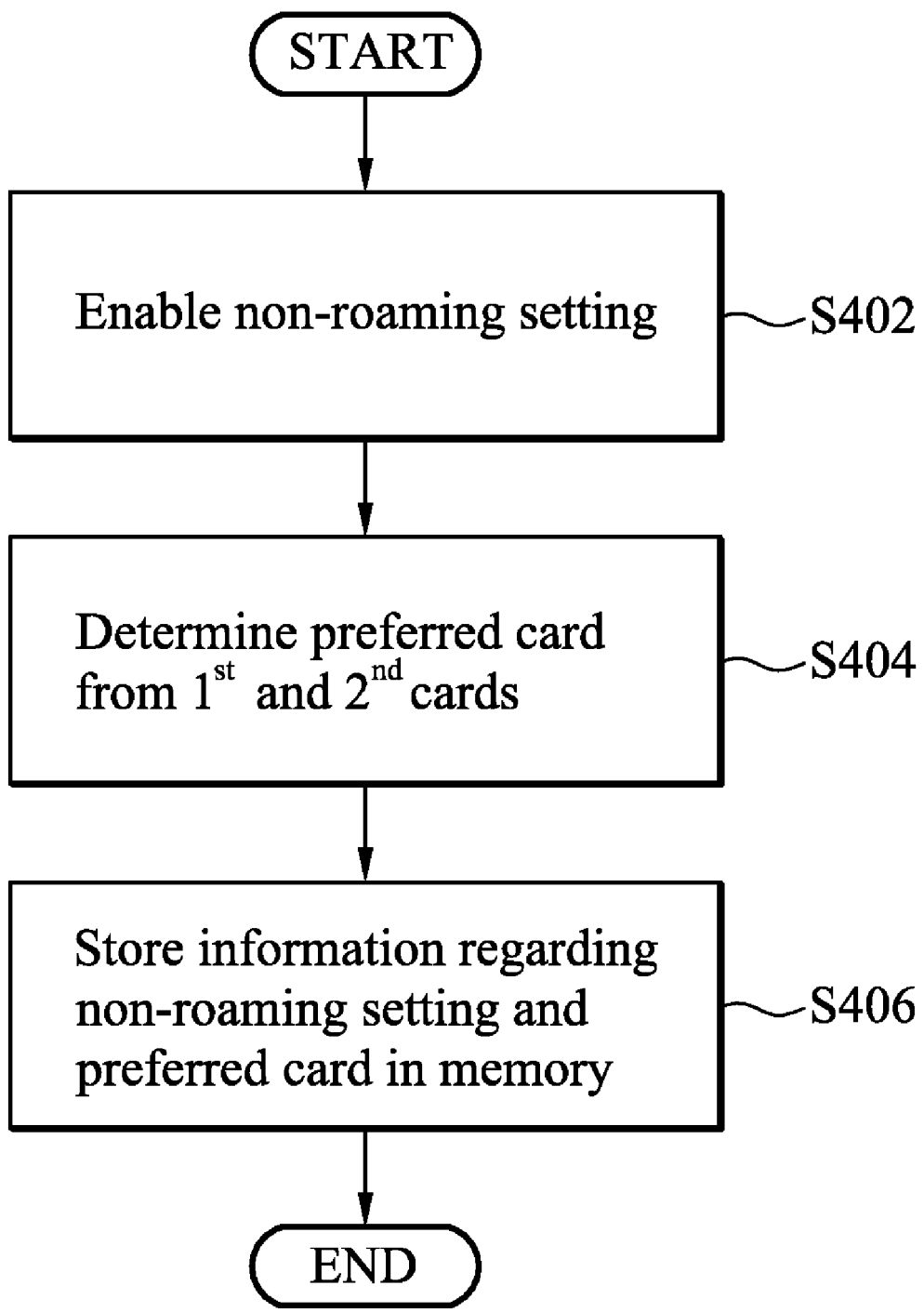
FIG. 4 shows an embodiment of a method for configuring a non-roaming setting in a mobile station equipped with a first subscriber identity card and a second subscriber identity card.

With two or more subscriber identity cards, in order to reduce communication fee, it is preferred to issue an MO request to a cell that a subscriber identity card camps on without roaming. FIG. 4 shows an embodiment of a method for configuring a non-roaming setting in a mobile station equipped with a first subscriber identity card and a second subscriber identity card. First, a non-roaming setting is enabled by a user through interactions with a man-machine interface (MMI) (step S402), so as to force an MO request to be issued to a called party via a cell (i.e. BSS, node-B or others) that a subscriber identity card camps on without roaming, wherein the MO request is issued to make an MO voice or a data call, or transmit an SMS message to the called party. The MMI may comprise screen menus and icons, command language and online help displayed on a display of the mobile station with at least one input device, such as a touch panel, physical keys on a key pad, buttons, dragging jogs and the similar. By using the input devices of the MMI, users may manually touch, press, click, rotate or move the input devices to operate the mobile station. Next, a preferred subscriber identity card is determined from the first and second subscriber identity cards by the user through interactions with the MMI (step S404). Next, in step S406, the information regarding the enabling/disabling of the non-roaming setting and the determined subscriber identity card are stored in a memory of the mobile station (not shown), such as a volatile/non-volatile storage device. According to the stored information, if the non-roaming setting has been enabled and one of the first and second subscriber identity cards is not roaming, an MO request for making an MO voice or data call, or transmitting an SMS message will be issued to a cell that one of the first and second subscriber identity cards camps on, which is non-roaming. Furthermore, if both the first and second subscriber identity cards are roaming/non-roaming, an MO request will be issued to a cell that the preferred subscriber identity card camps on.

Figure 5:
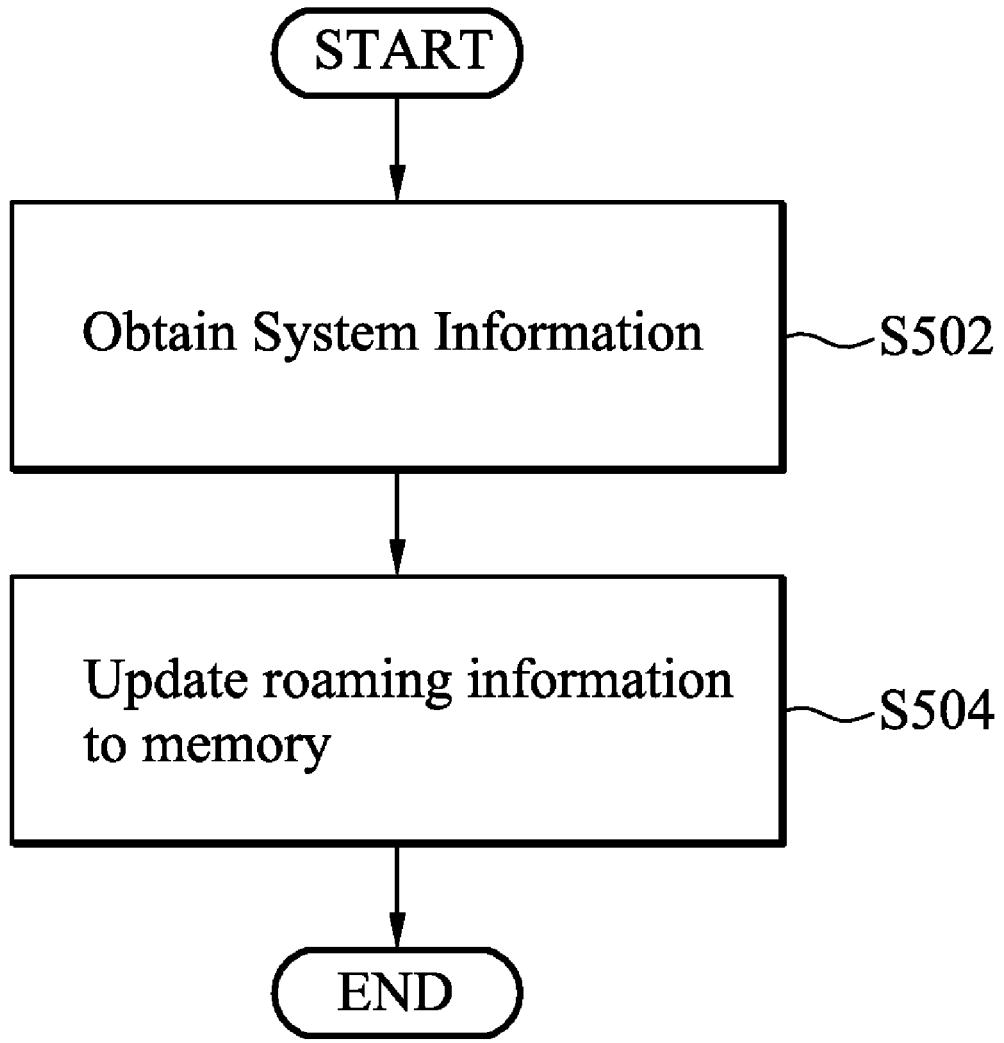

FIG. 5 shows an embodiment of a method for updating roaming information by a mobile station when listening to a cell that a subscriber identity card camps on. First, in step S502, the system information (such as a PLMN code) is obtained from listening to a BCCH, which is broadcasted from a cell that a subscriber identity card camps on. Next, the roaming information corresponding to the system information (SI) is updated and stored in a memory of the mobile station in response to the comparison of the IMSI or HPLMN code stored in the subscriber identity card with the listened PLMN code of SI from the network (step S504). For example, in a mobile station with a first subscriber identity card and a second subscriber identity card, the roaming information corresponding to the first subscriber identity card is obtained via a cell that the first subscriber identity card camps on and the roaming information corresponding to the second subscriber identity card is obtained via a cell that the second subscriber identity card camps on. If the MCC and MNC of the obtained PLMN code of SI are the same as that of the IMSI or HPLMN code of a subscriber identity card, the roaming information is updated to indicate that the subscriber identity card is in a non-roaming status. Otherwise, the roaming information is updated to indicate that the subscriber identity card is in a roaming status.

Figure 6:
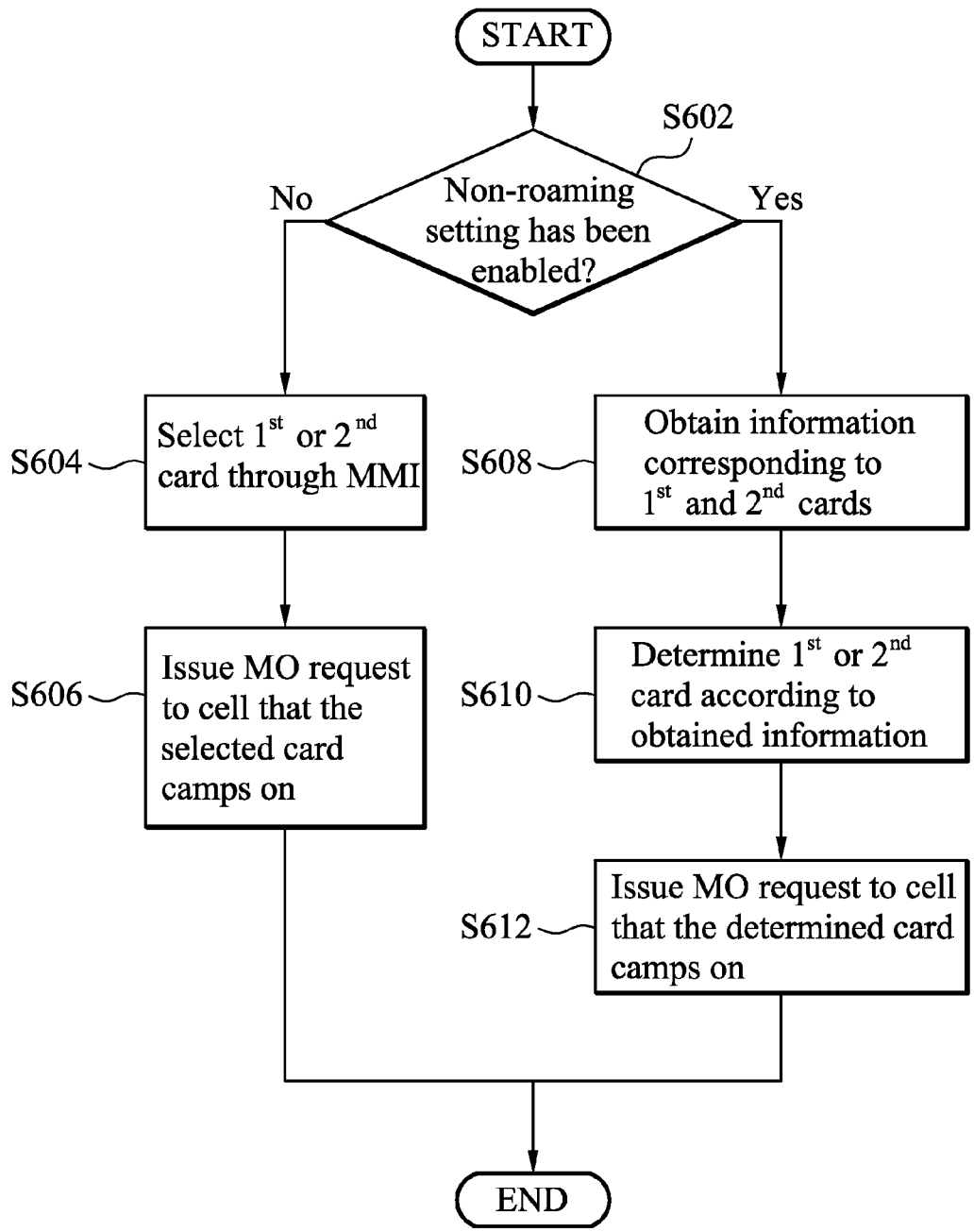
FIG. 6 shows a flow chart illustrating a method for transmitting an MO request by a mobile station with a first subscriber identity card and a second subscriber identity card according to an embodiment of the invention.

FIG. 6 shows a flow chart illustrating a method for transmitting an MO request by a mobile station with a first subscriber identity card and a second subscriber identity card, being performed when executing software/firmware code by a processor of the mobile station (e.g. 230 of FIG. 2A or 330 of FIG. 2B), according to an embodiment of the invention. First, in step S602, it is determined whether a non-roaming setting has been enabled when a user desires to send an MO request to a network for making an MO voice or data call, or transmitting an SMS message to a called party. If not, one of the first and second subscriber identity cards is selected by the user through interactions with an MMI (step S604), and then the MO request is issued to a cell that the selected subscriber identity card camps on (step S606). Note that reference may be made to the above description for detailed description of the MO call request signaling. If the non-roaming setting has been enabled, one of the first and second subscriber identity cards is determined (step S610) by obtaining the status information corresponding to the first and second subscriber identity cards which is stored in a memory of the mobile station and checking the stored status information (step S608), such as regarding the current roaming statuses of the first and second subscriber identity cards and the preferred subscriber identity card as described above. For example, the first subscriber identity card is determined when the roaming information indicates that the first subscriber identity card is in a non-roaming status and the second subscriber identity card is in a roaming status, or when the stored information indicates that the first and second subscriber identity cards are roaming/non-roaming and the first subscriber identity card is designated as the preferred subscriber identity card. Subsequently, the MO request is issued to a cell that the determined subscriber identity card camps on (step S612). Note that reference may be made to the above description for detailed description of the MO call request signaling.

Figure 7:
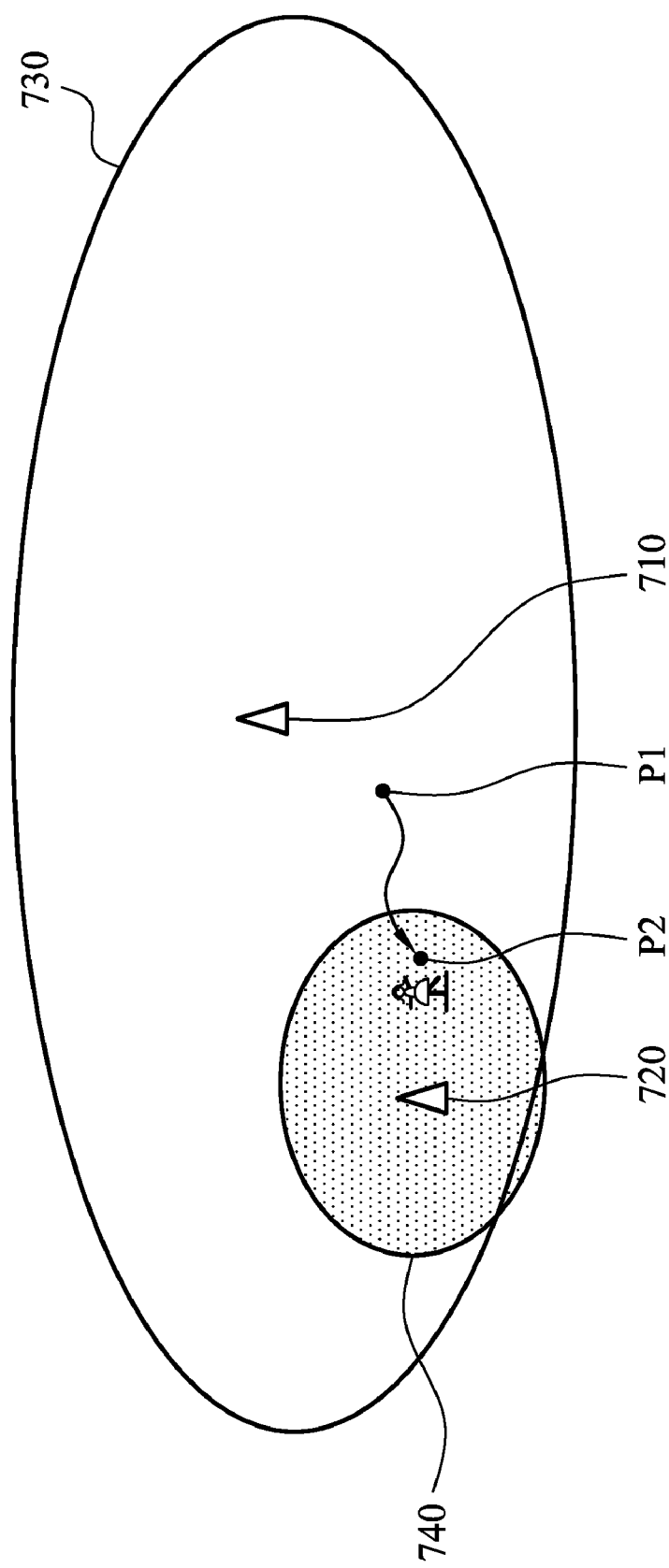
FIG. 7 shows a schematic diagram illustrating the coverage ranges of the different cells.

Some network operators may provide a lower fee scheme serving MO requests from certain cells which are referred to as the low-fee cells, which may be designated by users or operators. The coverage ranges of these low-fee cells are typically narrower. FIG. 7 shows a shematic diagram illustrating the coverage ranges of different cells 710 and 720. In FIG. 7, the cell 710 has a wider coverage range 730 and the cell 720 has a narrower coverage range 740, wherein the cells 710 and 720 may be provided by different network operators. When a mobile station carried by a user is moving from the place P1 to the place P2, it is preferred to issue an MO request to a called party via the cell 720 instead of the cell 710, so as to reduce communication fees and save power consumption as well.

Figure 8:
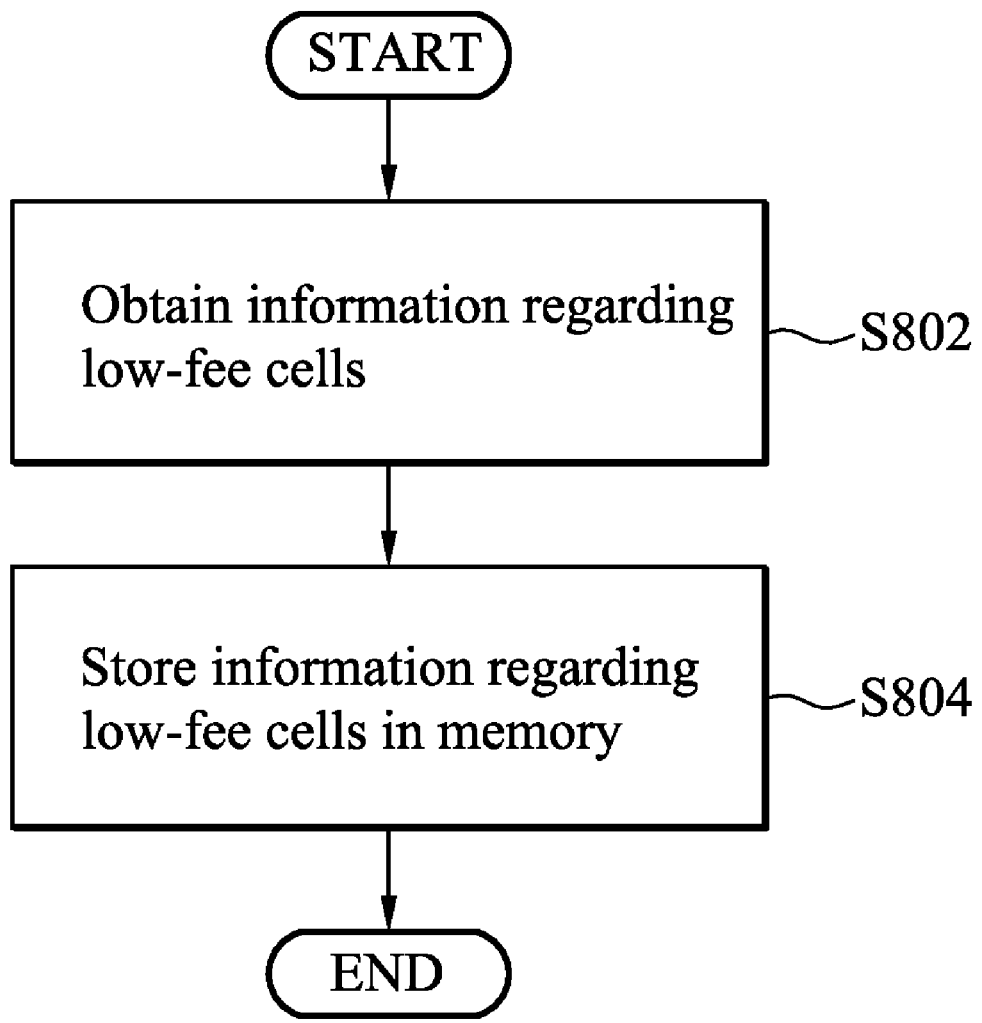
FIG. 8 shows an embodiment of a method for configuring a low-fee cell setting.

FIG. 8 shows an embodiment of a method for storing information regarding low-fee cells. First, information regarding the low-fee cells for one or more subscriber identity cards inserted into a mobile station is obtained (step S802), that is provided by a user through interactions with an MMI. For example, a list recording the cell identities (IDs) of the low-fee cells is provided by the user. It is to be understood that the low-fee cells are the cells neighboring with a cell that one subscriber identity card of the mobile station camps on at a specific moment, which are established by the same network operator, and the low-fee cells may be assigned by or registered to the network operator in advance. Next, in step S804, the provided information is subsequently stored in a storage device of the mobile station (not shown), such as a volatile/non-volatile memory, a hard drive, a removable disk or others. As a result, when entering an area covered by one or more low-fee cells, the mobile station preferably issues an MO request via the subscriber identity card corresponding to the low-fee cells.

Figure 9:
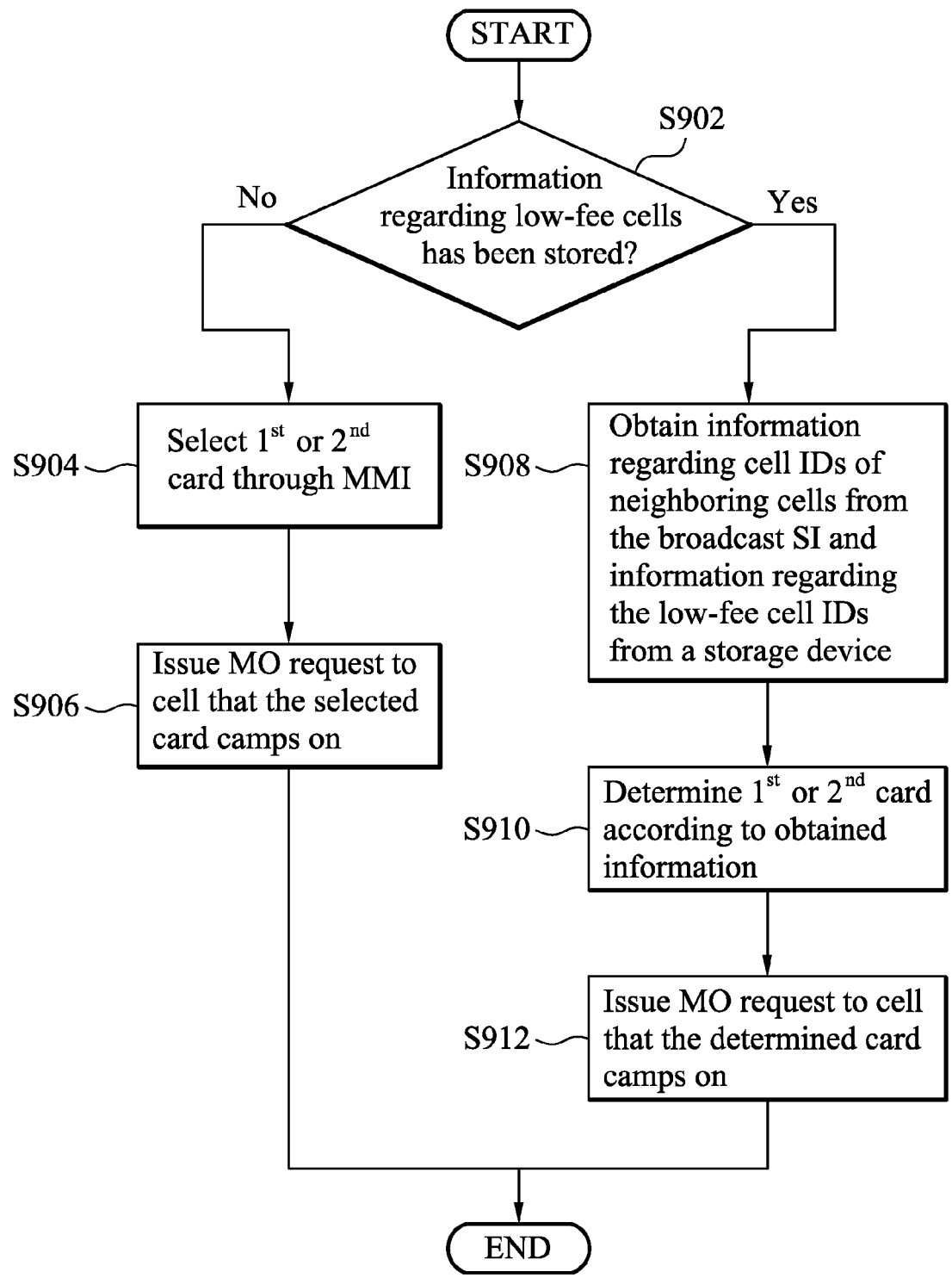
FIG. 9 shows a flow chart illustrating a method for transmitting an MO request by a mobile station with a first subscriber identity card and a second subscriber identity card according to an embodiment of the invention.

FIG. 9 shows a flow chart illustrating a method for transmitting an MO request by a mobile station with a first subscriber identity card and a second subscriber identity card, being performed when executing software/firmware code by a processor of the mobile station (e.g. 230 of FIG. 2A or 330 of FIG. 2B), according to an embodiment of the invention. Assume that the first subscriber identity card corresponds to several low-fee cells. First, in step S902, it is determined whether the information regarding the low-fee cells has been stored in a storage device of the mobile station when a user desires to send an MO request to a network for making an MO voice or data call, or transmitting an SMS message to a called party. If not, one of the first and second subscriber identity cards is selected by the user through interactions with an MMI (step S904), and then the MO request is issued to a cell that the selected subscriber identity card camps on (step S906). Note that reference may be made to the above description for detailed description of the MO call request signaling. If the information regarding low-fee cells has been stored, information regarding the cell IDs of neighboring cells of the cells that the first subscriber identity card camps on is obtained from the broadcast SI and information regarding the low-fee cell IDs is obtained from a storage device (step S908). Next, one of the first and second subscriber identity cards is accordingly determined (step S910). For example, the first subscriber identity card is determined when a certain percentage or number of the obtained neighboring cell IDs corresponding to the cell that the first subscriber identity card camps on is present in the stored list of low-fee cell IDs. Otherwise, the second subscriber identity card is determined. Subsequently, the MO request is issued to the cell that the determined subscriber identity card camps on (step S912). Note that reference may be made to the above description for detailed description of the MO call request signaling.

The determination of one of the cells that the dual subscriber identity cards camps on may base on a fare plan, so as to issue an MO request to the determined cell. FIG. 10 shows a table illustrating an exemplary fare plan that may be stored in a storage device of a mobile station, such as a volatile/non-volatile memory, a hard drive, a removable disk, or others. A first fare plan of a first subscriber identity card and a second fare plan of a second subscriber identity card are integrated into the fare plan. The fare plan states that a charge per second is 0.002 dollar when making an MO call to a called party with a prefix "0919" of a phone number between a time duration of 9 to 12 o'clock via the first subscriber identity card, or when making an MO call to a called party served by a network operator "CHT" between the time duration via the cell that the first subscriber identity card camps on. It is also stated in the fare plan that a charge per second is 0.0015 dollar when making an MO call to a called party with a prefix "0919" of a phone number between a time duration of 23 to 1 o'clock via the first subscriber identity card. Moreover, the fare plan states that a charge per second is 0.003 dollar when making an MO call to a called party with a prefix "0919" of a phone number between a time duration of 10 to 15 o'clock via the second subscriber identity card, or when making an MO call to a called party served by a network operator "CHT" between the time duration via the cell that the second subscriber identity card camps on.

Figure 11:
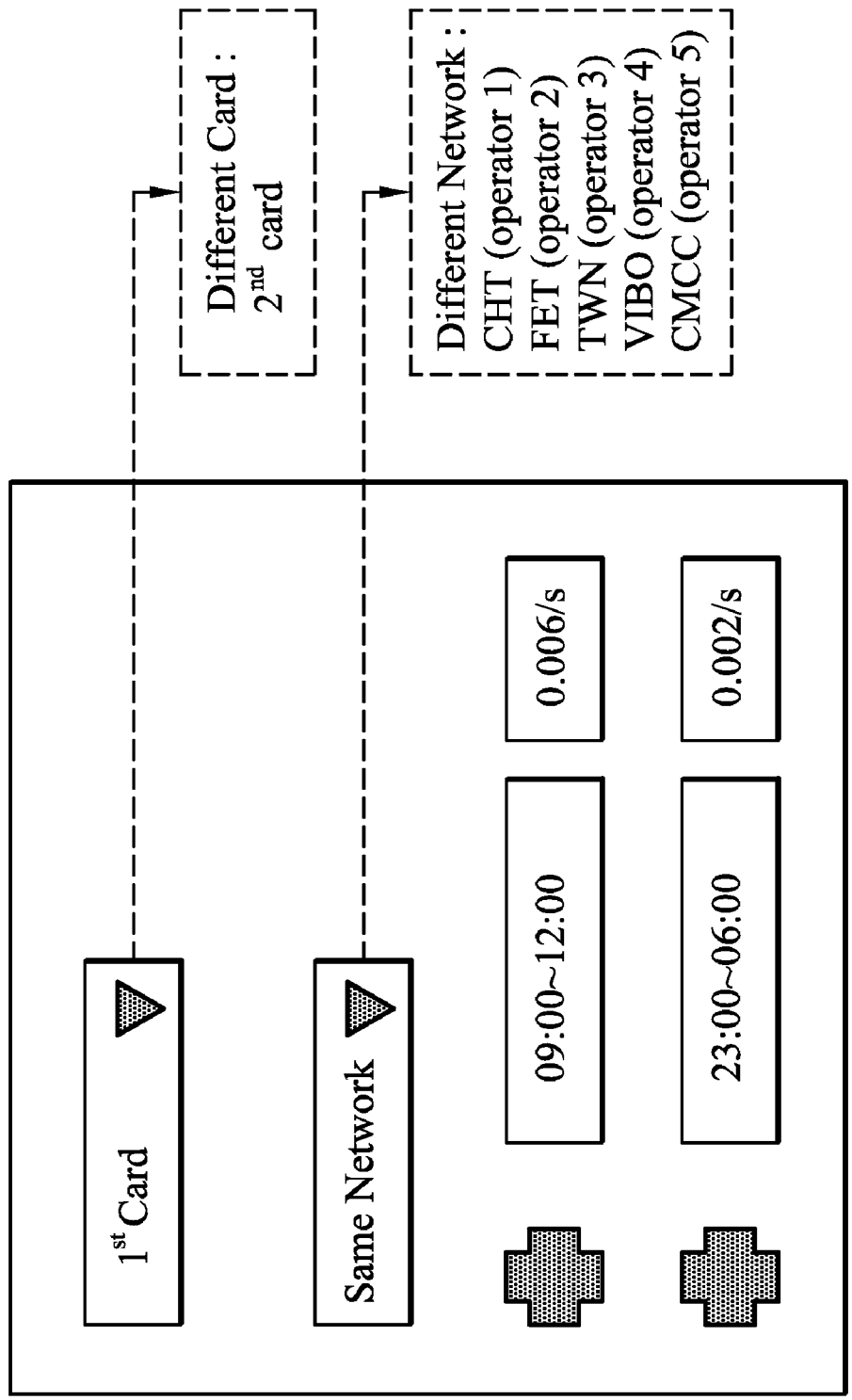
FIG. 11 shows a menu illustrating a fare plan stored in the mobile station established manually by a user through interaction with an MMI.

Such a fare plan stored in the mobile station may be established manually by a user through interactions with an MMI as shown in FIG. 11. Or, after successfully establishing an MO call, the network operator may send an Advice of Charge (AoC) message regarding call cost per unit time to the mobile station for the ongoing MO call. The mobile station may update the fare plan with reference to the received call cost per unit time of the AoC, current time, identified called operator, or dialed prefix number, or any combinations thereof. Or, the mobile station may periodically and automatically create or update the fare plan by analyzing the charging information. More specifically, the fare plan may be created or updated by parsing a monthly e-bills, where the e-bill provided by the network operator lists an amount for each MO call to a certain called party during a specific time duration.

Figure 12:
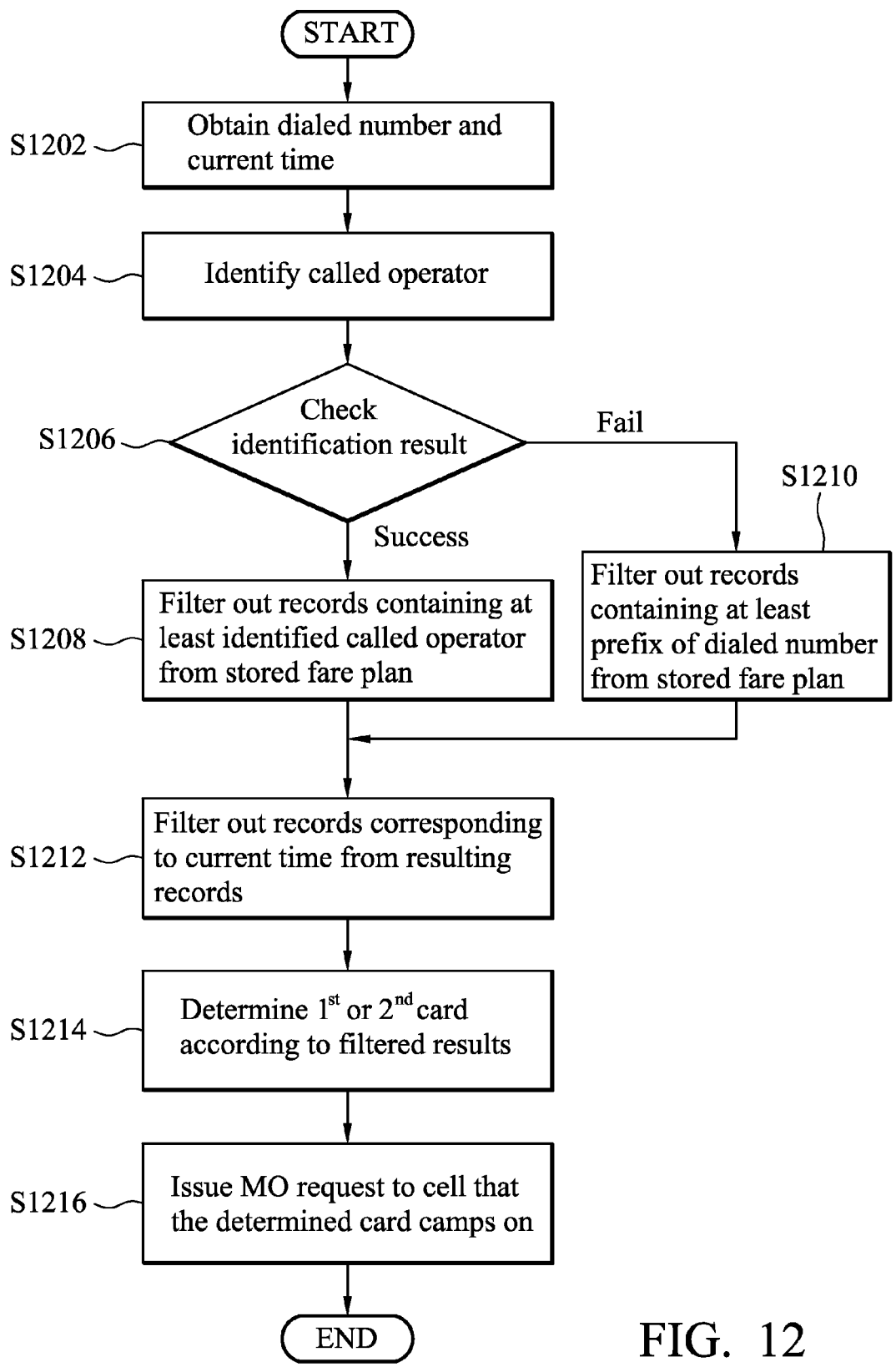
FIG. 12 shows a flow chart illustrating a method for transmitting an MO request by a mobile station with a first subscriber identity card and a second subscriber identity card according to an embodiment of the invention.

FIG. 12 shows a flow chart illustrating a method for transmitting an MO request by a mobile station with a first subscriber identity card and a second subscriber identity card, being performed when executing software/firmware code by a processor of the mobile station (e.g. 230 of FIG. 2A or 330 of FIG. 2B), according to an embodiment of the invention. First, in step S1202, a dialed number of a called party and a current time are obtained when a user desires to send an MO request for making an MO voice or data call, or transmitting an SMS message to the called party. Next, the mobile station may perform an identification procedure to identify a called operator according to the dialed number (step S1204). Next, the identification result is checked in step S1206. When the identification result is successful, i.e. the called operator is successfully identified, records containing at least the identified called operator are filtered out from the stored fare plan (step S1208). Otherwise, records containing at least the prefix of the dialed number are filtered out therefrom, that is, records related to the identified called operator are filtered out (step S1210). Next, in step S1212, the records corresponding to the current time are further filtered out from the resulting records resulted from step S1208 or S1210. Next, one of the first and second subscriber identity cards corresponding to the lowest charge per second is discovered and determined by inspecting the final filtered results (step S1214). Next, the MO request is issued to the called party via a cell that the determined subscriber identity card camps on (step S1216). Note that reference may be made to the above description for detailed description of the MO call request signaling. For example, referring to FIG. 10, when a user desires to make a voice call to a number with a prefix "0919" at 10:30 AM, the mobile station may inspect the stored fare plan and determine to issue an MO voice call request via a cell that the first subscriber identity card camps on due to 0.002 dollar being the lowest charge per second at 10:30 AM.

Figure 13:
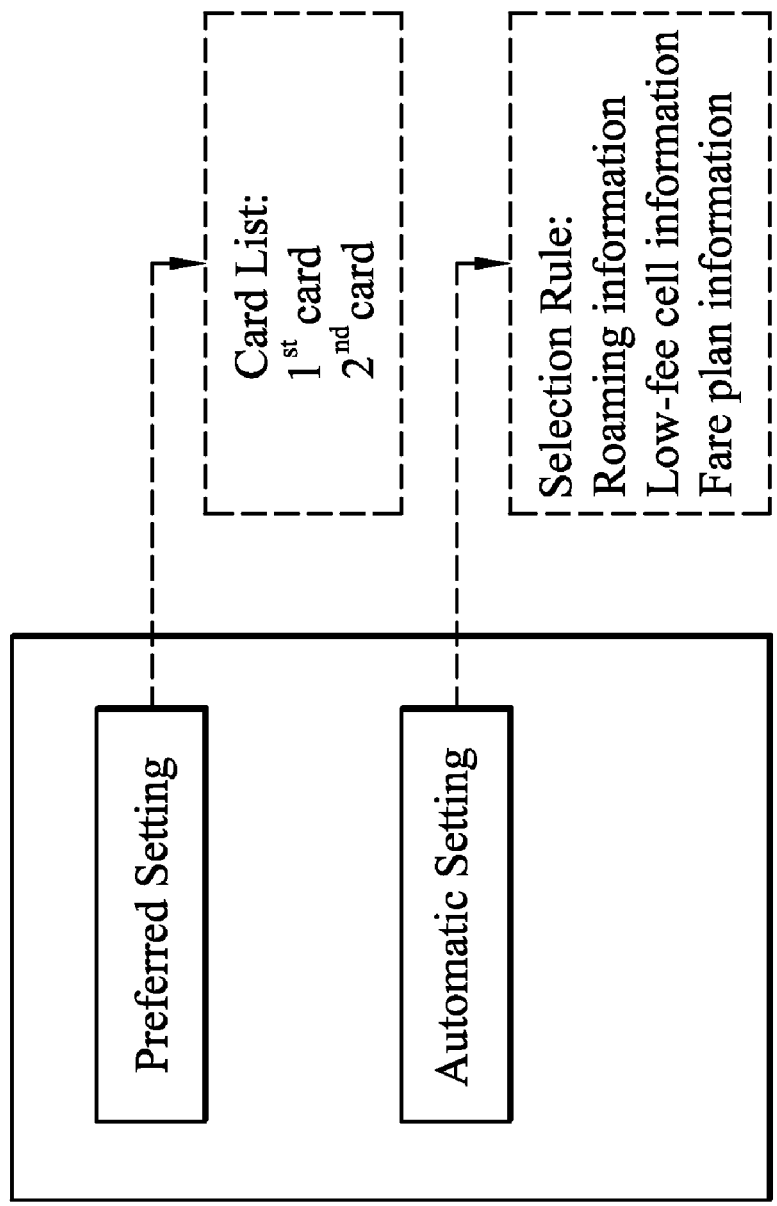
FIG. 13 shows a user interface illustrating a menu for setting a preferred setting and an automatic setting to determine a first subscriber identity card or a second subscriber identity card of a mobile station to issue a mobile originated request.

FIG. 13 shows a user interface illustrating a menu for configuring a preference setting and an automation setting for future determination of a first subscriber identity card or a second subscriber identity card of a mobile station to issue a mobile originated request. The preference setting is configured manually by a user through interactions with an MMI to designate one of the first and second subscriber identity cards as a preferred subscriber identity card. After the preferred subscriber identity card is determined, the mobile station may send an MO request via the preferred subscriber identity card when the preference setting has been enabled and the user desires to make an MO voice or data call, or transmit an SMS message to a called party. Furthermore, the automation setting is set manually by a user through interactions with an MMI to determine one card by a selection rule for future utilization according to the roaming information, low-fee cell information or fare plan information stored in a storage device of the mobile station. For an example, when the preference setting is disabled and the roaming information is designated as the base condition of the selection rule, the mobile station may obtain the information regarding the roaming statuses of the first and second subscriber identity cards, and then may automatically check the roaming statuses to determine one subscriber identity card without roaming, so as to issue an MO request via the non-roaming subscriber identity card. For another example, when the preference setting is disabled and the low-fee cell information is designated as the base condition of the selection rule, the mobile station may obtain the information regarding the stored low-fee cell IDs and the neighboring cell IDs from the SI, and then may automatically compare the neighboring cell IDs with the low-fee cell IDs to determine whether to camp on a low-fee cell via a relevant subscriber identity card for future issuance of an MO request. For still another example, when the preference setting is disabled and the fare plan information is designated as the base condition of the selection rule, the mobile station may obtain the information regarding a fare plan, and then may automatically check the fare plan to determine one subscriber identity card with the lowest charge per second, so as to issue an MO request via the determined subscriber identity card.

Figure 14:
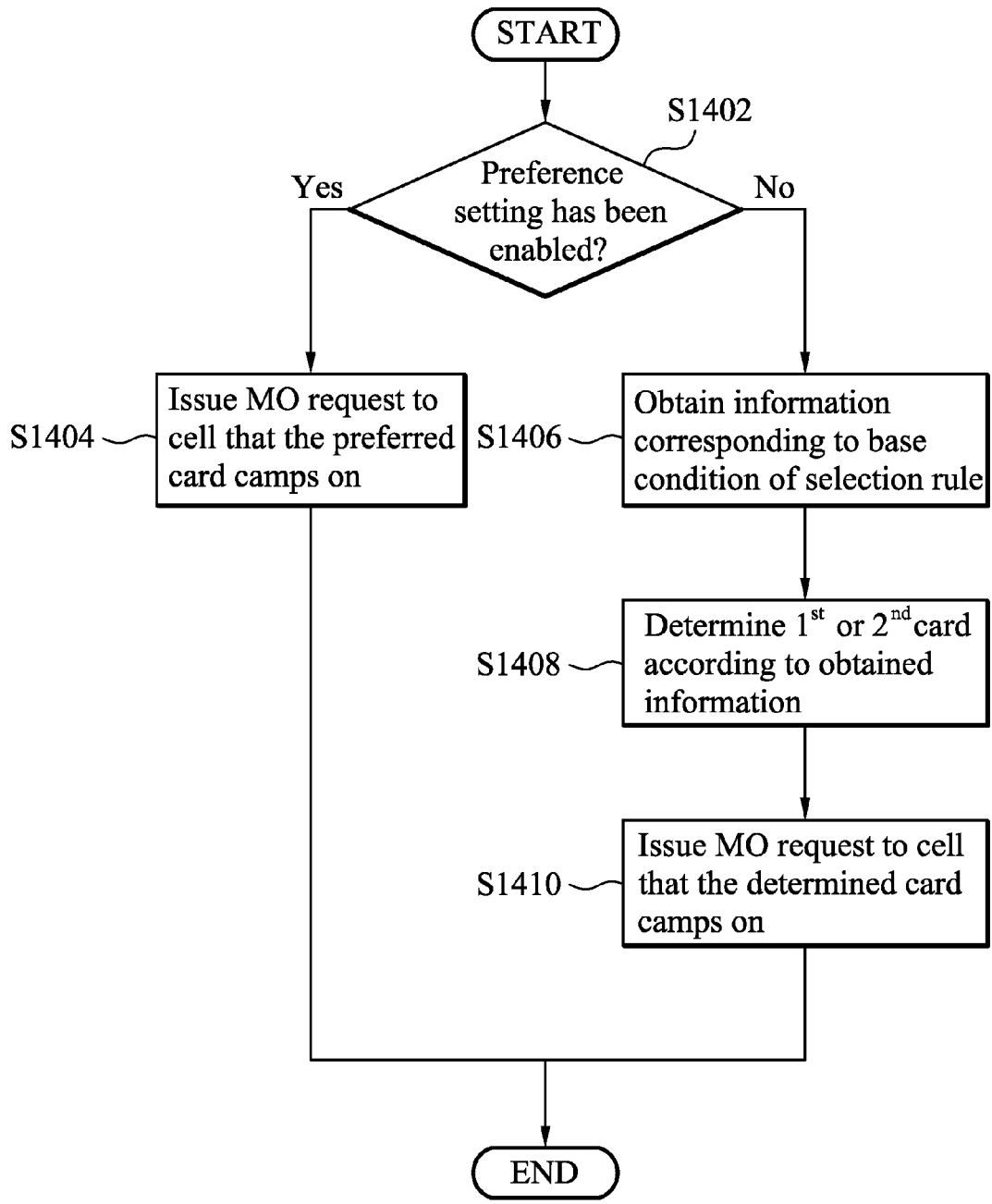
FIG. 14 shows a flow chart illustrating a method for transmitting an MO request by a mobile station with a first subscriber identity card and a second subscriber identity card according to an embodiment of the invention.

FIG. 14 shows a flow chart illustrating a method for transmitting an MO request by a mobile station with a first subscriber identity card and a second subscriber identity card, being performed when executing software/firmware code by a processor of the mobile station (e.g. 230 of FIG. 2A or 330 of FIG. 2B), according to an embodiment of the invention. First, it is determined whether a preference setting has been enabled (step S1402), wherein the preference setting further indicates a preferred subscriber identity card set by a user through interactions with an MMI in advance. If the preference setting has been enabled, the MO request is issued to a called party via the preferred subscriber identity card (step S1404). Note that reference may be made to the above description for detailed description of the MO call request signaling. If the preference setting is disabled, the information corresponding to a base condition of a selection rule is obtained (S1406). As described above, the information may be the roaming, low-fee cells or fare plan information. Next, one of the first and second subscriber identity cards is determined according to the obtained information (step S1408). Subsequently, the MO request is issued to the called party via the determined subscriber identity card (step S1410). Note that reference may be made to the above description for detailed description of the MO call request signaling.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for transmitting a mobile originated request by a mobile station with a first subscriber identity card and a second subscriber identity card, performed by a processor of the mobile station, comprising: determining whether a preference setting has been enabled, wherein the preference setting is enabled via a man-machine interface (MMI); obtaining a preferred subscriber identity card from the first and second subscriber identity cards when the preference setting has been enabled; issuing the mobile originated request to a called party via the preferred subscriber identity card when the preference setting has been enabled; issuing the mobile originated request to the called party via one subscriber identity card from the first subscriber identity card and the second subscriber identity card determined by a rule when the preference setting is disabled.

2. The method as claimed in claim 1, wherein a condition of the rule comprises roaming information regarding the roaming statuses of the first and second subscriber identity cards, and the mobile originated request is issued to the called party via one subscriber identity card without roaming.

3. The method as claimed in claim 1, wherein a condition of the rule comprises cell information regarding whether at least a certain percentage or number of the neighboring cell identities (IDs) corresponding to a first cell that the first subscriber identity card camps on is present in a plurality of preset low-fee cell IDs, and, if so, the mobile originated request is issued to the called party via the first subscriber identity card, otherwise, the mobile originated request is issued to the called party via the second subscriber identity card.

4. The method as claimed in claim 1, wherein a condition of the rule comprises fare plan information regarding the charges of the first and second subscriber identity cards at a current time, and the mobile originated request is issued to the called party via one specific subscriber identity card with the lowest charge.

5. A method for transmitting a mobile originated request by a mobile station with a first subscriber identity card and a second subscriber identity card, performed by a processor of the mobile station, comprising:

obtaining a first roaming information indicating whether the first subscriber identity card is in a roaming or non-roaming status, and a second roaming information indicating whether the second subscriber identity card is in a roaming or non-roaming status;

determining one subscriber identity card from the first subscriber identity card and the second subscriber identity card according to the first roaming information and the second roaming information when the first roaming information and the second roaming information indicate that the roaming statuses of the first and second subscriber identity cards are different;

determining a preferred subscriber identity card from the first subscriber identity card and the second subscriber identity card when the first roaming information and the second roaming information indicate that the roaming statuses of the first and second subscriber identity cards are the same; and issuing the mobile originated request to a called party via a cell that the determined subscriber identity card camps on.

6. The method as claimed in claim 5, wherein the first subscriber identity card is determined when the first roaming information indicates that the first subscriber identity card is in a non-roaming status and the second roaming information indicates that the second subscriber identity card is in a roaming status.

7. The method as claimed in claim 5, wherein the first roaming information indicates that the first subscriber identity card is in a non-roaming status when a Mobile Country Code (MCC) and a Mobile Network Code (MNC) stored in the first subscriber identity card are the same as that of a System Information (SI) broadcasted in a first cell that the first subscriber identity card camps on, and the second roaming information indicates that the second subscriber identity card is in a non-roaming status when an MCC and an MNC stored in the second subscriber identity card are the same as that of an SI broadcasted in a second cell that the second subscriber identity card camps on.

8. A method for transmitting a mobile originated request by a mobile station with a first subscriber identity card and a second subscriber identity card, performed by a processor of the mobile station, comprising:

obtaining a first cell identity report from a first cell that the first subscriber identity card camps on, wherein the first cell identity report comprises a plurality of cell identities (IDs) of the neighboring cells of the first cell;

obtaining a plurality of low-fee cell IDs from a storage device of the mobile station;

determining the first subscriber identity card when at least a certain percentage or number of the neighboring cell IDs is present in the low-fee cell IDs;

determining the second subscriber identity card when a certain percentage or number of the neighboring cell IDs is not present in the low-fee cell IDs; and issuing the mobile originated request to a called party via a cell that the determined subscriber identity card camps on.

9. The method as claimed in claim 8, wherein the first cell identity report is obtained from System Information (SI) broadcasted in the first cell.

10. A method for transmitting a mobile originated request by a mobile station with a first subscriber identity card and a second subscriber identity card, performed by a processor of the mobile station, comprising:

obtaining a dialed number of a called party and a current time;

identifying a called operator according to the dialed number;

reading a first fare plan for the first subscriber identity card and a second fare plan for the second subscriber identity card from a storage device of the mobile station;

filtering out at least one first record related to the identified called operator and the current time from the first fare plan and at least one record related to the identified called operator and the current time from the second fare plan;

determining one subscriber identity card with the lowest charge by comparing charge rates recorded in the filtered out first record and second record; and issuing the mobile originated request to the called party via the determined subscriber identity card.

11. The method as claimed in claim 10, wherein the step of filtering further comprises:

filtering out at least one first record related to a prefix number of the dialed number and the current time from the first fare plan and at least one second record related to the prefix number of the dialed number and the current time from the second fare plan.

12. The method as claimed in claim 10, wherein the first or second fare plan is obtained from a man-machine interface.

13. The method as claimed in claim 10, wherein the first or second fare plan is obtained from at least one advice of charge (AoC) message sent by a first network operator providing the first subscriber identity card or a second network operator providing the second subscriber identity card.

14. The method as claimed in claim 10, wherein the first or second fare plan is obtained by parsing a monthly bill provided by a first network operator providing the first subscriber identity card or a second network operator providing the second subscriber identity card.

15. An apparatus for transmitting a mobile originated request, equipped with a first subscriber identity card and a second subscriber identity card, comprising: a processor determining whether a preference setting has been enabled, wherein the preference setting is enabled via a man-machine interface (MMI), obtaining a preferred subscriber identity card from the first and second subscriber identity cards when the preference setting has been enabled, issuing the mobile originated request to a called party via the preferred subscriber identity card when the preference setting has been enabled, and issuing the mobile originated request to the called party via one subscriber identity card from the first subscriber identity card and the second subscriber identity card determined by a rule when the preference setting is disabled.

16. The apparatus as claimed in claim 15, wherein a condition of the rule comprises roaming information regarding the roaming statuses of the first and second subscriber identity cards, and the processor issues the mobile originated request to the called party via one subscriber identity card without roaming when the preference setting is disabled.

17. The apparatus as claimed in claim 15, wherein a condition of the rule comprises cell information regarding whether at least a certain percentage or number of the neighboring cell identities (IDs) corresponding to a first cell that the first subscriber identity card camps on is present in a plurality of preset low-fee cell IDs, and the processor issues the mobile originated request to the called party via the first subscriber identity card when the percentage or number of the neighboring cell identities (IDs) corresponding to the first cell is present in the preset low-fee cell IDs, and the preference setting is disabled.

18. The apparatus as claimed in claim 15, wherein a condition of the rule comprises fare plan information regarding the charges of the first and second subscriber identity cards at a current time, and processor issues the mobile originated request to the called party via one specific subscriber identity card with the lowest charge when the preference setting is disabled.

19. An apparatus for transmitting a mobile originated request, equipped with a first subscriber identity card and a second subscriber identity card, comprising:
a processor obtaining a first roaming information indicating whether the first subscriber identity card is in a roaming or non-roaming status, and a second roaming information indicating whether the second subscriber identity card is in a roaming or non-roaming status, determining one subscriber identity card from the first subscriber identity card and the second subscriber identity card according to the first roaming information and the second roaming information when the first roaming information and the second roaming information indicate that the roaming statuses of the first and second subscriber identity cards are different, determining a preferred subscriber identity card from the first subscriber identity card and the second subscriber identity card when the first roaming information and the second roaming information indicate that the roaming statuses of the first and second subscriber identity cards are the same, and issuing the mobile originated request to a called party via a cell that the determined subscriber identity card camps on.

20. The apparatus as claimed in claim 19, wherein the processor determines the first subscriber identity card when the first roaming information indicates that the first subscriber identity card is in a non-roaming status and the second roaming information indicates that the second subscriber identity card is in a roaming status.

21. The apparatus as claimed in claim 19, wherein the first roaming information indicates that the first subscriber identity card is in a non-roaming status when a Mobile Country Code (MCC) and a Mobile Network Code (MNC) stored in the first subscriber identity card are the same as that of a System Information (SI) broadcasted in a first cell that the first subscriber identity card camps on, and the second roaming information indicates that the second subscriber identity card is in a non-roaming status when an MCC and an MNC stored in the second subscriber identity card are the same as that of an SI broadcasted in a second cell that the second subscriber identity card camps on.

22. An apparatus for transmitting a mobile originated request, equipped with a first subscriber identity card and a second subscriber identity card, comprising:
a processor obtaining a first cell identity report from a first cell that the first subscriber identity card camps on, wherein the first cell identity report comprises a plurality of cell identities (IDs) of the neighboring cells of the first cell, obtaining a plurality of low-fee cell IDs from a storage device of the mobile station, determining the first subscriber identity card when at least a certain percentage or number of the neighboring cell IDs is present in the low-fee cell IDs, determining the second subscriber identity card when a certain percentage or number of the neighboring cell IDs is not present in the low-fee cell IDs, and issuing the mobile originated request to a called party via a cell that the determined subscriber identity card camps on.

23. The apparatus as claimed in claim 22, wherein the first cell identity report is obtained from System Information (SI) broadcasted in the first cell.

24. An apparatus for transmitting a mobile originated request, equipped with a first subscriber identity card and a second subscriber identity card, comprising:
a processor obtaining a dialed number of a called party and a current time, identifying a called operator according to the dialed number, reading a first fare plan for the first subscriber identity card and a second fare plan for the second subscriber identity card from a storage device of the mobile station, filtering out at least one first record related to the identified called operator and the current time from the first fare plan and at least one record related to the identified called operator and the current time from the second fare plan, determining one subscriber identity card with the lowest charge by comparing charge rates recorded in the filtered out first record and second record, and issuing the mobile originated request to the called party via the determined subscriber identity card.

25. The apparatus as claimed in claim 24, wherein the processor further filters out at least one first record related to a prefix number of the dialed number and the current time from the first fare plan and at least one second record related to the prefix number of the dialed number and the current time from the second fare plan.

26. The apparatus as claimed in claim 24, wherein the processor obtains the first or second fare plan by sending at least one advice of charge (AoC) message to a first network operator providing the first subscriber identity card or a second network operator providing the second subscriber identity card.

27. The apparatus as claimed in claim 24, wherein the first or second fare plan is obtained by parsing a monthly bill provided by a first network operator providing the first subscriber identity card or a second network operator providing the second subscriber identity card.

* * * * *